(12) United States Patent  
Sells et al.

(10) Patent No.: US 11,366,051 B2
(45) Date of Patent: Jun. 21, 2022

(54) MICROFLUIDIC SENSING (71) Applicant: Hewlett-Packard Development Company, L.P., Houston, TX (US)

(72) Inventors: Jeremy Sells, Corvallis, OR (US); Nick McGuinness, San Diego, CA (US); Chantelle Domingue, Corvallis, OR (US); Manish Giri, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 998 days.

(21) Appl. No.: 15/546,342

(22) PCT Filed: Jan. 30, 2015

(86) PCT No.: PCT/US2015/013636
§ 371 (c)(1),
(2) Date: Jul. 26, 2017

(87) PCT Pub. No.: WO2016/122552
PCT Pub. Date: Aug. 4, 2016

(65) Prior Publication Data
US 2018/0003611 A1  Jan. 4, 2018

(51) Int. Cl.
*G01N 15/10* (2006.01)
*B01L 3/00* (2006.01)

(52) U.S. Cl.
CPC .... *G01N 15/1056* (2013.01); *B01L 3/502715* (2013.01); *B01L 3/502761* (2013.01);
(Continued)

(58) Field of Classification Search
None
See application file for complete search history.

(56) References Cited

U.S. PATENT DOCUMENTS 5,370,842 A    12/1994  Miyazaki et al.
7,390,387 B2*  6/2008  Childers ................ B03C 5/005
                                              204/547

(Continued)

FOREIGN PATENT DOCUMENTS

CN    103471982 B    12/2013
CN    1 03894248      7/2014

(Continued)

OTHER PUBLICATIONS

Kyle Brewer et al. "Microfluidics-Based Detection of Particle Properties", Jun. 13, 2014, XP055503229, Corvallis, OR, USA Retrieved from the Internet.

(Continued)

*Primary Examiner* — Lyle Alexander
*Assistant Examiner* — Bryan Kilpatrick
(74) *Attorney, Agent, or Firm* — Dicke Billig & Czaja PLLC (57) ABSTRACT

A device including a microfluidic channel structure formed on a substrate and including a first channel and a fluid actuator within the microfluidic channel structure. A sense region within the first channel is to receive a fluid flow of target biologic particles for counting in a single file pattern, with the sense region having a volume on a same order of magnitude as a volume of a single one of the target biologic particles.

20 Claims, 6 Drawing Sheets

(52) U.S. Cl.
CPC .. G01N 15/1031 (2013.01); *B01L 2200/0647* (2013.01); *B01L 2300/0627* (2013.01); *B01L 2300/0645* (2013.01); *B01L 2300/0681* (2013.01); *B01L 2300/087* (2013.01); *B01L 2300/0816* (2013.01); *B01L 2400/0439* (2013.01); *B01L 2400/0442* (2013.01); *G01N 2015/1006* (2013.01); *G01N 2015/1062* (2013.01)

(56) References Cited

U.S. PATENT DOCUMENTS

| | | | |
|---|---|---|---|
| 8,540,355 | B2 | 9/2013 | Govyadinov et al. |
| 2002/0095073 | A1 | 7/2002 | Jacobs |
| 2003/0175947 | A1 | 9/2003 | Liu |
| 2005/0118705 | A1 | 6/2005 | Rabbitt et al. |
| 2007/0238112 | A1 | 10/2007 | Sohn et al. |
| 2008/0087584 | A1* | 4/2008 | Johnson ............... C12M 47/04 209/606 |
| 2008/0213821 | A1 | 9/2008 | Liu et al. |
| 2010/0001963 | A1 | 1/2010 | Droay et al. |
| 2011/0089328 | A1 | 4/2011 | Li |
| 2012/0247964 | A1 | 10/2012 | Lee et al. |
| 2012/0264134 | A1* | 10/2012 | Ionescu-Zanetti ..... C12M 21/06 435/6.13 |
| 2013/0295588 | A1* | 11/2013 | Watkins ................. G01N 15/12 702/19 |
| 2013/0315782 | A1 | 11/2013 | Huang |
| 2014/0061049 | A1 | 3/2014 | Lo et al. |
| 2014/0199719 | A1 | 7/2014 | Shih et al. |
| 2014/0251879 | A1 | 9/2014 | Deshpande et al. |
| 2014/0295421 | A1* | 10/2014 | Link .................. B01F 33/3011 435/23 |
| 2014/0311912 | A1 | 10/2014 | Shih et al. |
| 2017/0087550 | A1* | 3/2017 | Lee .................... G01N 15/1056 |

FOREIGN PATENT DOCUMENTS

| | | |
|---|---|---|
| JP | H05240872 | 9/1993 |
| JP | 10318907 | 12/1998 |
| JP | 2007003414 | 1/2007 |
| JP | 2010181399 | 8/2010 |
| JP | WO2014122873 A1 | 8/2014 |
| TW | 200525024 | 8/2005 |
| TW | 200525025 | 8/2005 |
| TW | 200928364 | 7/2009 |
| WO | WO-2003104771 A1 | 12/2003 |
| WO | WO-2007025559 A1 | 3/2007 |
| WO | WO-2011124092 | 10/2011 |
| WO | WO-2014178827 | 11/2014 |

OTHER PUBLICATIONS

Taek Dong Chung et al. "Recent advances in miniaturized microfluidic flow cytometry for clinical use", https://doi.org/10.1002/elps.200700620, Dec. 10, 2007.

Agilent DNA 1000 Kit Quick Start Guide; Agilent Technologies.

ANBM Seeks Partners to Move Forensic Labonachip Platform to Market; University of Arizona; Center for Applied NanoBioscience & Medicine.

Jagtiani, A.V. et al.; Micro-fluidic Chip and Micro-fluidic Chip System for Single Cell Analysis and Single Cell Analyzing Method; IOPScience, Journal of Micromechanics and Microengineering; vol. 21 No 4; Mar. 24, 2011.

Kuschel et al.; Use of Lab-on-a-Chip Technology for Protein Sizing and Quantitation; Journal of Biomolecular Techniques, vol. 13, Issue 3, Sep. 2002; pp. 172-178.

McGuinness et al., Microfluidic Sensing Device, Appln. No. PCT/US2014/0137848; Filed Jan. 30, 2014.

Romanuik, S.F. et al.; An Impedimetric Approach for Accurate Particle Sizing Using a Microfluidic Coulter Counter; IEEE Sensors 2008 Conference; Mar. 26-29, 2008.

Sridharamurthy et al.; A Microfluidic Chemical/Biological Sensing System Based on Membrane Dissolution and Optical Absorption; Nov. 30, 2006; http://mnsa_ece_wise_edu/Publications/J12/J12_pdf.

Weigum et al.; Nano-bio-chip Sensor Platform for Examination of Oral Exfoliative Cytology: National Institutes of Health; Cancer Prev Res (Phila). Apr. 2010 ; 3(4): 518-528.

Yung et al.; Recent Improvement in Miniaturization and Integration of a DNA Analysis System for Rapid Forensic Analysis (MiDAS); Avens Publishing Group; J Forensic Investigation; Aug. 2014 vol. 2 Issue: 2.

* cited by examiner

MICROFLUIDIC SENSING

BACKGROUND

Microfluidics applies across a variety of disciplines and involves the study of small volumes of fluid and how to manipulate, control and use such small volumes of fluid in various systems and devices, such as microfluidic chips. For example, in some instances a microfluidic chip may be used as a "lab-on-chip", such as for use in the medical and biological fields to evaluate fluids and their components.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

At least some examples of the present disclosure are directed to microfluidic devices to evaluate biologic fluids. In some examples, such microfluidic devices may be employed in cytology, such as cell counting and analysis. For instance, one common medical procedure includes evaluating a blood sample to determine a white blood cell count or a red blood cell count, which may be indicative of a particular medical condition, health of an organ, etc.

At least some examples of the present disclosure provide for high throughput and increased accuracy in cytology on a microfluidic chip via high signal-to-noise ratios achievable by employment of single file sensing and a low fluid dilution factor, among other features and attributes. In some examples, this arrangement is at least partially enabled via providing a sense region within a channel structure of the microfluidic chip, in which the sense region has a volume (e.g. a sense volume) of the same order of magnitude as a volume of the biologic particle of interest.

By causing the biologic particles of interest to pass through the sensing region in a single file pattern, the arrangement provides for sensing or counting biologic particles on a one-at-a-time basis.

In some examples, this arrangement is at least partially enabled via providing a non-uniform flow field within the channel structure prior to and/or within the sense region. In some examples, the non-uniform flow field is at least partially enabled via an exclusion structure located upstream from the sense region to exclude biologic particles larger than the target biologic particle of interest. In some examples, the non-uniform flow field is at least partially enabled via a reduction in the cross-sectional area of the channel structure just prior to the sense region.

Moreover, when the above-described features are combined with other operational aspects of the microfluidic device, in some examples, a throughput rate of sensing (e.g. counting) up to 1 million biologic particles per second are achievable. In some examples, such operational aspects of the microfluidic device include the use of on-board pumps, on-board heaters, on-board mixing, and/or on-board sensors, all present on a small footprint substrate.

Rapid counting via these high throughout rates, in turn, significantly reduces a total time of testing involving a particular biologic particle to thereby make point-of-care diagnostic testing practical for real world, clinical settings and while doing so with relatively low cost test chips.

Cytology procedures utilizing at least some examples of the present disclosure are not restricted to blood, but extend to other biologic fluids or biologic fluid preparations to detect bacteria and/or viruses in saliva, urine, spinal fluid, etc. Other applicable examples include counting yeast cells in a brewery environment, or obtaining sperm cell counts or egg counts. As further described below, at least some examples of the present disclosure achieve high accuracy and throughput for these many different types and sizes of biologic particles via providing sensing structures sized and/or shaped to enhance sensing (e.g. counting) the particular biologic particle of interest.

These examples, and additional examples, are described and illustrated in association with at least FIGS. 1-17.

Figure 1:
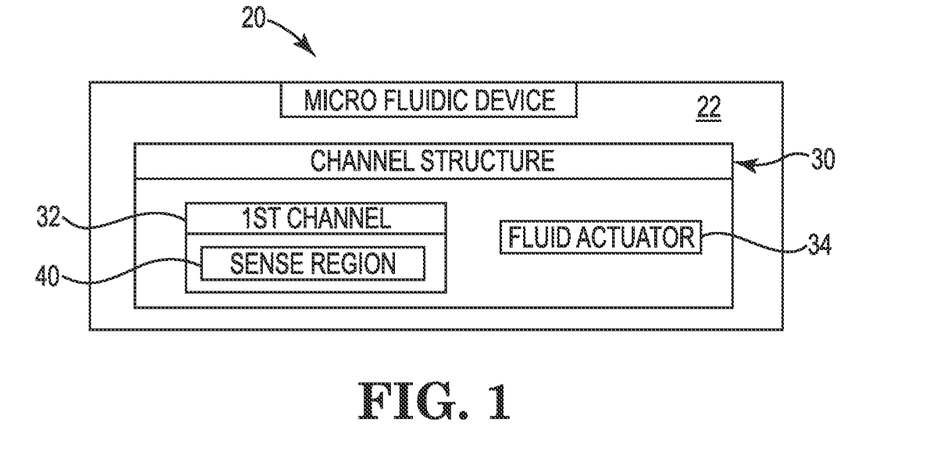
FIG. 1 is block diagram schematically illustrating a microfluidic device, according to an example of the present disclosure.

FIG. 1 is a block diagram schematically illustrating a microfluidic device 20, according to an example of the present disclosure. As shown in FIG. 1, the microfluidic device 20 is formed on a substrate 22, and includes a channel structure 30, which in turn includes a first channel 32 and a fluid actuator 34 to cause movement of fluid through at least the first channel 32. The first channel 32 includes a sense region 40 to facilitate sensing a biologic particle of interest, i.e. a target biologic particle.

In some examples, the target biologic particle forms part of a biologic fluid, such as whole or partial blood. Some example biologic particles include red blood cells, white blood cells, viruses, etc. found within whole or partial blood. In some examples, the biologic particle forms part of other natural biologic fluids or other biologic fluid preparations, as noted above.

In some instances, the microfluidic device 20 is referred to as a microfluidic chip or a biologic test chip.

Figure 2:
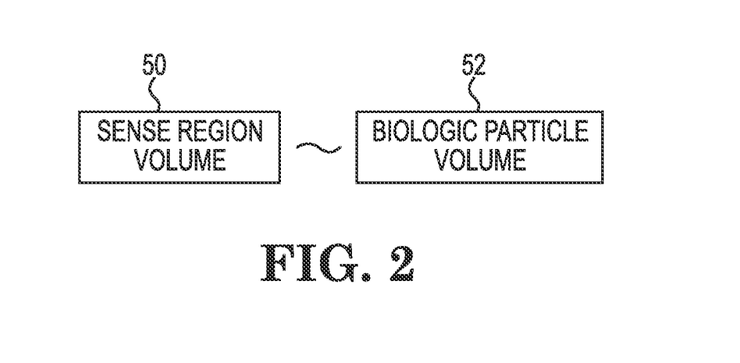
FIG. 2 is a block diagram schematically illustrating a relationship between a sense region volume and biologic particle volume, according to an example of the present disclosure.

As further illustrated in FIG. 2, in some examples the sense region has a volume 50 that is commensurate with a volume 52 of the target biologic particle within the fluid flowing in the first channel 32. In particular, in some examples, the sense region volume 50 is on the same order of magnitude as the biologic particle volume 52. In some instances, the sense region volume 50 is referred to herein as the sense volume.

The dimensions and volumes of some examples of different types of biologic particles are further described later.

Figure 3:
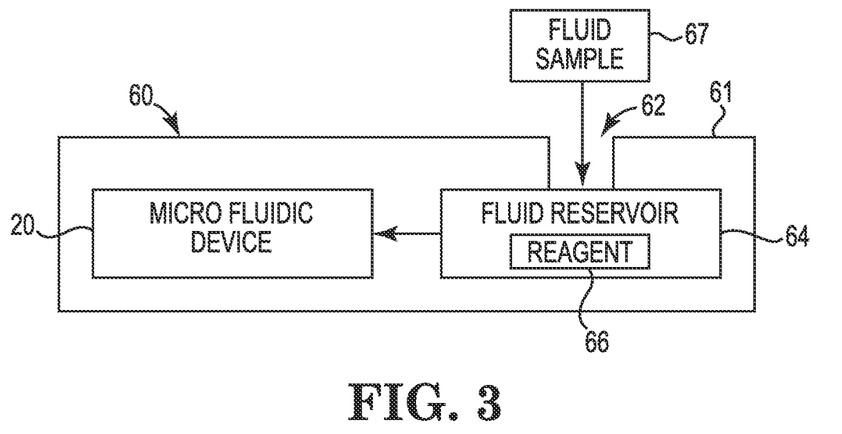
FIG. 3 is a block diagram schematically illustrating a cassette housing a microfluidic device, according to an example of the present disclosure.

FIG. 3 is a block diagram schematically illustrating a module 60 including a microfluidic device 20 (FIGS. 1-2), according to an example of the present disclosure. In some instances, the module is referred to as a cassette or container. As shown in FIG. 3, module 60 includes a housing 61 that at least partially contains and/or supports the microfluidic device 20.

In some examples, as shown in FIG. 3 fluid reservoir 64 is defined within housing 61 in close proximity to microfluidic device 20 to enable fluid communication therebetween. As shown via FIG. 3, the fluid sample 67 is deposited (via inlet 62) to enter fluid reservoir 64 and mix with reagent(s) 66 before flowing into microfluidic device 20. In some instances, microfluidic device 20 includes its own reservoir to initially receive the fluid sample (mixed with reagents 66) from reservoir 64 before the fluid flows into channels of the microfluidic device 20.

If the fluid sample 67 is blood, then in some examples the reagent(s) 66 includes an anti-coagulant, such as ethylenediamine tetraacetic acid (EDTA), and/or buffer solution such as phosphate buffered saline (PBS). In some examples, a suitable blood sample has volume of about 2 microliters while the reagent has a volume of about 8 microliters, leading to a volume of 10 microliters to be processed via the microfluidic device 20. Accordingly, in this arrangement, a dilution factor of about 5 is applied to the fluid sample of whole blood. In some examples, dilution factors of more than or less than 5 are applied to whole blood. In some examples, such low dilution factors ensure a high signal-to-noise ratio when a sense volume of the fluid (to be tested) passed through the sensing region at which target biological particles are counted. In addition, lower dilution factors involve a smaller total volume of fluid to be processed by the microfluidic device, which in turn reduces the total test time for the particular fluid sample. In some examples, a dilution factor that is equal to or less than ten is employed.

In some examples, whether the fluid sample 67 is blood or another type of biological fluid, volumes greater or less than 2 microliters can be used. In addition, in some examples, whether the fluid sample 67 is blood or another type of biologic fluid, reagent volumes greater or less than 8 microliters can be used. In some examples, a fluid sample 67 is also diluted with other or additional fluids other than reagents 66.

In some examples, the dilution factor for blood or any fluid sample 67 can be implemented according to the order of tens, which includes dilution factors such as 10, 20, 30, 40, 50, 60, 70, 80, and 90, as well as quantities intervening between these stated values.

It will be understood that in some examples, the dilution factor (applied to fluid sample 67) can be implemented according to the order of ones, which includes dilution factors of one, two, three, four, five, six, seven, eight, and nine.

It will be further understood that when whole blood is the fluid sample 67, in some examples the reagent(s) 66 include other or additional reagents to prepare the blood for a diagnostic test of interest. In some examples, such reagent(s) 66 help sensors identify certain particles in the fluid sample in order to track them, count them, move them, etc. In some examples, such reagent(s) 66 bind with certain particles in the fluid sample 67 in order to facilitate excluding or filtering those certain particles from the fluid to better isolate or concentrate a particular biologic particle of interest. In some examples, the operation of the reagent(s) 66 works in cooperation with filters and/or other sorting and segregation mechanisms to exclude certain biologic particles from a sensing region of the microfluidic device 20.

In some examples, reagent(s) 66 include materials suitable to perform antibody-antigen binding for micro-particle tagging and/or materials suitable to implement nano-particle tagging techniques, magnetic particle sorting techniques, and/or high density particle tagging techniques.

In some examples, at least some reagent(s) 66 include lysing agents, such as (but not limited to) when it is desired to separate out red blood cells prior to implementing subsequent counting or analysis of white blood cells.

Of course, in the event that the fluid sample 67 is not blood but is a different biologic fluid, such as urine, spinal fluid, etc., then reagent(s) 66 would include an appropriate type and number of reagent(s) 66 suited to handling such fluids and to achieve the desired separation and sorting of the components of those fluids.

Figure 4:
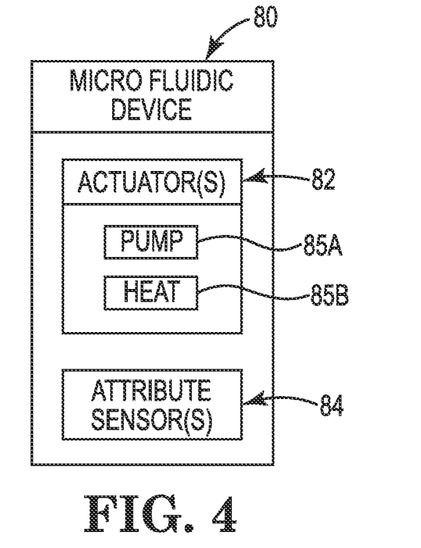
FIG. 4 is a block diagram schematically illustrating a microfluidic device, according to an example of the present disclosure.

FIG. 4 is a block diagram schematically illustrating a microfluidic device 80, according to an example of the present disclosure. In some examples, microfluidic device 80 includes at least some of substantially the same features and attributes as microfluidic device 20 of FIGS. 1-3. In some examples, at least some components of microfluidic device 80 of FIG. 3 are incorporated within the microfluidic device 20 of FIGS. 1-3.

As shown in FIG. 3, microfluidic device 80 includes actuator(s) 82 and attribute sensor(s) 84, with actuators 82 functioning as a pump 85A and/or as a heater 85B. In some examples, actuator 82 comprises a resistive element, such as a thermal resistor. When activated at a high intensity, and sufficient pulse width, the actuator 82 may nucleate a vapor bubble that displaces fluid within the channel structure 30 to drive fluid along and through the channel structure 30. As a byproduct, a moderate amount of heat may be produced. In one aspect, such high intensity activation involves a relatively short pulse width, and higher power.

However, when activated at a low intensity and insufficient pulse width, the actuator 82 does not act as a pump because insufficient energy is present to cause a nucleation event, and thus significant fluid displacement. Instead, heat may be produced, such that actuator 82 functions as a heater 85B without displacing fluid. In one aspect, such low intensity activation involves a relatively longer pulse width, and lower power.

In some examples, microfluidic device 80 includes an attribute sensor(s) 84 to detect an attribute of the fluid or constituents of the fluid. In some examples, the attribute sensor 84 comprises an impedance sensor to count biologic particles flowing through channel structure 30, as further described below in association with at least FIGS. 10-17.

A later described control interface 106 is couplable to an electrical interface of the microfluidic device for energizing and controlling operations of the actuator(s) 82 and sensor(s) 84. In some examples, the structures and components of the chip-based microfluidic device 20, 80 are fabricated using integrated circuit microfabrication techniques such as electroforming, laser ablation, anisotropic etching, sputtering, dry and wet etching, photolithography, casting, molding, stamping, machining, spin coating, laminating, and so on.

Figure 5:
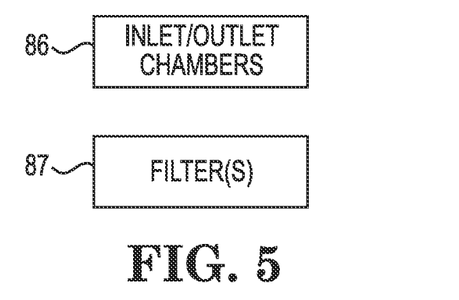
FIG. 5 is a block diagram schematically illustrating components of a microfluidic device, according to an example of the present disclosure.

FIG. 5 is a block diagram schematically illustrating components 86, 87 of a microfluidic device, according to an example of the present disclosure. In some examples, a microfluidic device such as device 20, 80 (FIGS. 1-4) further includes inlet/outlet chambers 86 and/or filters 87. The inlet/outlet chambers enable fluid to enter and exit various portions of the channel structure 30 while filters 87 segregate different components of a fluid from each other, such as excluding larger particles from further passage through the channel structure 30, as further noted later. In some instances, such filters 87 are referred to as an exclusion structure.

Figure 6:
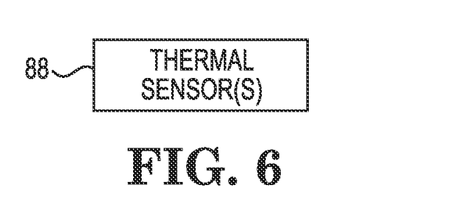
FIG. 6 is a block diagram schematically illustrating a component of a microfluidic device, according to an example of the present disclosure.

FIG. 6 is a block diagram schematically illustrating a thermal sensor 88 of a microfluidic device, according to an example of the present disclosure. In some examples, a microfluidic device such as device 20, 80 (FIGS. 1-4) further includes a thermal sensor(s) 88. In some examples, thermal sensor 88 tracks a temperature of at least the channel structure 30 and the fluid therein to facilitate managing reaction processes associated with implementing a test of interest on a given biologic fluid present within the channel structure 30. In one example, the thermal sensor(s) 88 is a resistive element that changes resistance as a function of the temperature of the resistive element.

Figure 7:
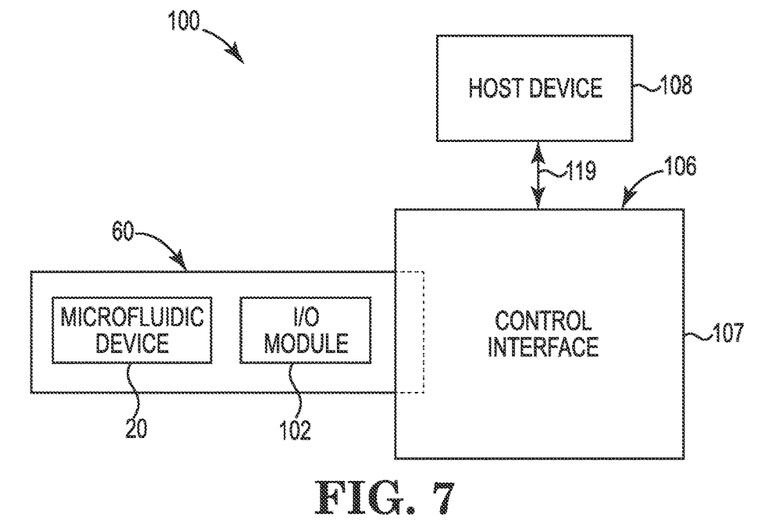
FIG. 7 is a block diagram schematically illustrating a microfluidic test system, according to an example of the present disclosure.

FIG. 7 is a block diagram schematically illustrating a microfluidic test system, according to an example of the present disclosure. As shown in FIG. 7, system 100 includes a cassette 60, a control interface 106 (with housing 107), and a host device 108. In some examples, cassette 60 includes at least some of substantially the same features and attributes as cassette 60, as previously described in association with at least FIG. 3, and with microfluidic device 20 including at least some of substantially the same features and attributes as microfluidic device 20, 80, as previously described in association with at least FIGS. 1-6.

As shown in FIG. 7, in addition to at least microfluidic device 20, cassette 60 includes an input/output (I/O) module 102 to communicate power, data, and/or control signals, etc. between the microfluidic device 20 (within cassette 60) and the control interface 106, which is in turn in communication with the host device 108.

In some examples, as shown in FIG. 7, cassette 60 is removably couplable to the control interface 106 so that it can be coupled and uncoupled as desired. The control interface 106 is removably couplable to the host device 108 as further described below. In some instances, the control interface 106 is referred to as or embodied as a dongle or connector.

In general terms, a fluid sample 67 (FIG. 3) is processed through microfluidics and applied to a sensing region in the microfluidic device 20 under control of the control interface 106. The microfluidic device 20 provides an electrical output signal representing the sensor data (e.g. a count of biologic particles) to the control interface 20. With the control interface 20 under control of the host device 108, the host device 108 can send and receive data to and from the control interface 106, including command information for controlling the microfluidic device 20 and obtaining sensor data obtained from the microfluidic device 20.

Figure 8:
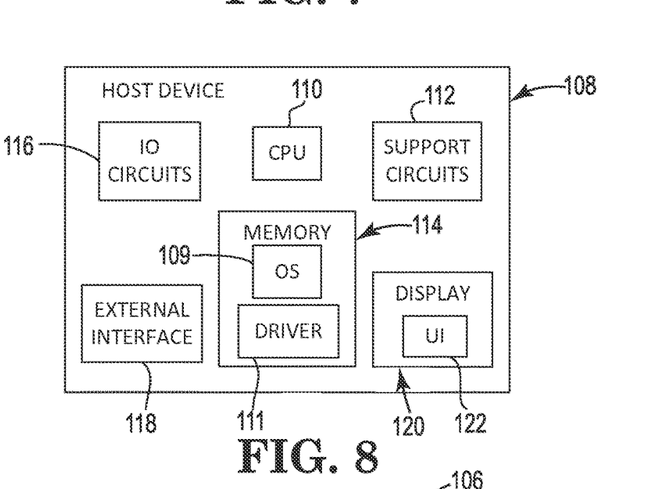
FIG. 8 is a block diagram schematically illustrating a host device of the system of FIG. 7, according to an example of the present disclosure.

FIG. 8 is a block diagram schematically illustrating the host device 108 (FIG. 7), according to an example of the present disclosure. As shown in FIG. 8, in some examples, the host device 108 generally includes a central processing unit (CPU) 110, various support circuits 112, memory 114, various input/output (10) circuits 116, and an external interface 118. The CPU 110 includes a microprocessor. In some examples, the support circuits 112 include a cache, power supplies, clock circuits, data registers, and the like. In some examples, the memory 114 includes random access memory, read only memory, cache memory, magnetic read/write memory, or the like or any combination of such memory devices. In some examples, the IO circuits 116 cooperate with the external interface 118 to facilitate communication with the control interface 106 over a communication medium 119 (shown in FIG. 7). The communication medium 119 can involve any type of wired and/or wireless communication protocol and can include electrical, optical, radio frequency (RF), or the like transfer paths.

In some examples, the external interface 118 includes a universal serial bus (USB) controller to send and receive data to the control interface 106, as well as providing power to the control interface 106, over a USB cable. It is to be understood that in some examples, other types of electrical, optical, or RF interfaces to the control interface 106 are used to send and receive data and/or provide power.

In some examples, as shown in FIG. 8, the memory 114 of host device 108 stores an operating system (OS) 109 and a driver 111. The OS 109 and the driver 111 include instructions executable by the CPU 110 for controlling the host device 108 and for controlling the control interface 106 through the external interface 118. The driver 111 provides an interface between the OS 109 and the control interface 106. In some examples, the host device 108 comprises a programmable device that includes machine-readable instructions stored on non-transitory processor/computer readable-media (e.g., the memory 114).

In some examples, as shown in FIG. 8, the host device 108 includes a display 120 through which the OS 109 can provide a graphical user interface (GUI) 122. A user can use the user interface 122 to interact with the OS 109 and the driver 111 to control the control interface 106, and to display data received from the control interface 106. It will be understood that the host device 108 can be any type of general or specific-purposed computing device. In an example, the host device 108 is a mobile computing device, such as a "smart phone," "tablet" or the like.

Figure 9:
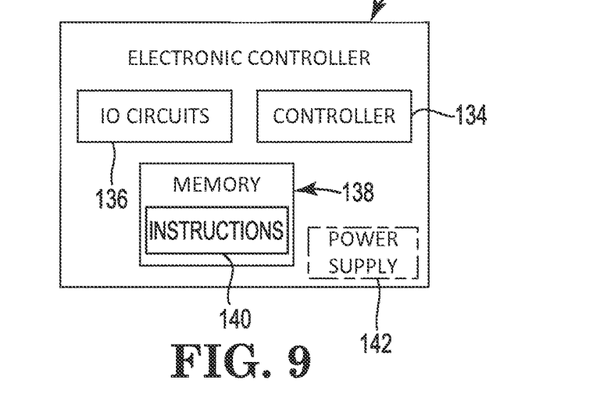
FIG. 9 is a block diagram schematically illustrating a control interface of the system of FIG. 7, according to an example of the present disclosure.

FIG. 9 is a block diagram schematically illustrating the control interface 106, according to an example of the present disclosure. In one example, the control interface 106 includes a controller 134, IO circuits 136, and a memory 138. The controller 134 comprises a microcontroller or microprocessor. In some examples, control interface 106 receives power from the host device 108, while in some examples, the control interface 106 includes a power supply 142.

In some examples, memory 138 stores instructions 140 executable by the controller 134 for at least partially controlling the microfluidic device 20 and/or for communicating with the host device 108. As such, the control interface 106 comprises a programmable device that includes machine-readable instructions 140 stored on non-transitory processor/computer readable-media (e.g., the memory 138). In other examples, the control interface 106 may be implemented using hardware, a combination of hardware and instructions 140 stored in memory 138. For instance, in some examples all or a portion of the control interface 106 is implemented using a programmable logic device (PLD), application specific integrated circuit (ASIC), or the like.

Figure 10:
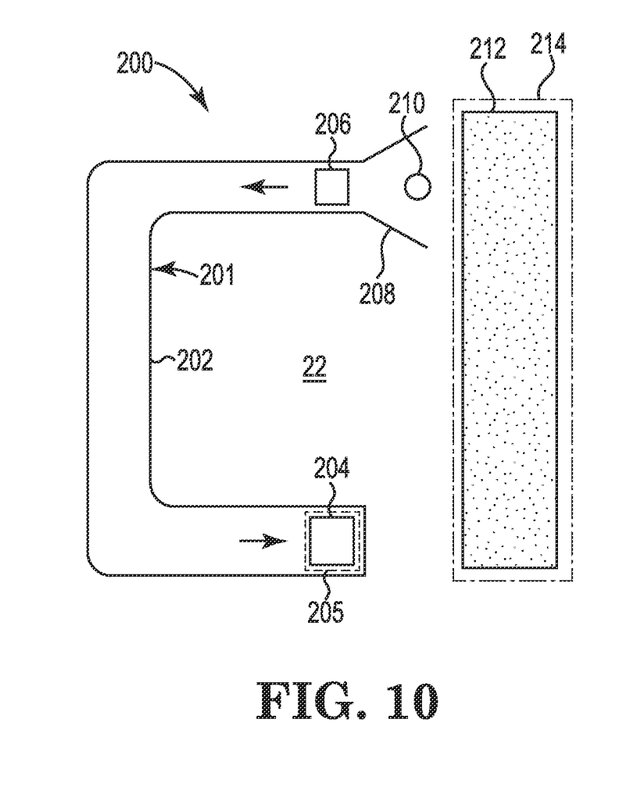
FIG. 10 is a plan view schematically illustrating a portion of a microfluidic device including a channel structure and associated components, according to an example of the present disclosure.

FIG. 10 is a diagram schematically illustrating a microfluidic structure 200 of a portion of a microfluidic device 20, according to an example of the present disclosure. In some examples, the microfluidic structure 200 includes at least some of substantially the same features and attributes as microfluidic device 20, 80 as previously described in association with at least FIGS. 1-9.

As shown in FIG. 10, in some examples the microfluidic structure 200 includes a microfluidic channel 202, a fluid actuator 204, a sensor 206, a nozzle 205 (e.g., outlet), and an inlet 208. FIG. 10 also depicts a fluid reservoir 214, which is in communication with the fluid reservoir 64 of cassette 60 (FIG. 3). In some examples, a mesh filter 212 is provided in the fluid reservoir 214 for filtering particles in the applied fluid sample. While the shape of the fluid channel 202 in FIG. 10 is shown as being "U-shaped", this is not intended as a general limitation on the shape of the channel 202. Thus, the shape of the channel 202 can include other shapes, such as curved shapes, serpentine shapes, shapes with corners, combinations thereof, and so on. Moreover, the channel 202 is not shown to any particular scale or proportion. The width of the channel 202 as fabricated on a device can vary from any scale or proportion shown in the drawings of this disclosure. The arrows in the channel indicate an example direction of fluid flow through the channel.

The inlet 208 provides an opening for the channel 202 to receive the fluid. In some examples, the filter 210 is disposed in the inlet 208 and prevents particles in the fluid of a particular size (depending on the size of the filter 210) from entering the channel 202. In some examples, the inlet 208 can have a larger width and volume than the channel 202. For instance, the inlet 208 can define a progressively narrowing cross-sectional area in the downstream orientation. In one aspect, as further described below, these structures help to create a non-uniform flow field, which facilitates single file flow of biologic particles into channel 202.

However, it will be understood that in some examples, such filters 210 are not located in inlet 208, but are located upstream from inlet 208 and external to channel 202. In some examples, a filter is located in the cassette 60 upstream from the reservoir 214. As noted elsewhere, in some instances such a filter is referred to as an exclusion structure. In some examples, the sensor 206 is disposed in the channel 202 near the inlet 208 (e.g., closer to the inlet 208 than the pump actuator 204) as shown in FIG. 10. In some examples, the sensor 206 is disposed in the inlet 208. In some examples, the sensor 206 is an impedance sensor and detects impedance changes as biologic particles in the fluid pass over the sensor 206. In some examples, the sensor 206 produces a signal whose intensity is directly proportional to the size of the biologic particle passing over/through the sensor 206, and thereby provides a basis to count biologic particles.

Further details regarding such structures are described below in association with at least FIGS. 11-16.

As further shown in FIG. 10, in some examples the fluid actuator 204 (e.g. pump) is disposed near a closed end of the channel 202 downstream from the sensor 206. The fluid actuator 204 can be a fluidic inertial pump actuator, which can be implemented using a wide variety of structures. In some examples, the fluid actuator 204 is a thermal resistor that produces vapor bubbles to create fluid displacement within the channel 202. The displaced fluid is ejected from the nozzle 405, thereby enabling an inertial flow pattern within/through channel 202. In some examples, fluid actuator 204 is implemented as piezo elements (e.g., PZT) whose electrically induced deflections generate fluid displacements within the channel 202. Other deflective membrane elements activated by electrical, magnetic, and other forces are also possible for use in implementing the fluid actuator 204.

In some examples, the fluid actuator 204 causes fluid displacements of less than ten picoliters and can be fired at a frequency ranging from 1 Hz to 100 kHz.

In general terms, the fluid actuator 204 is positioned in sufficiently close proximity to sensor 20 to ensure high fluid flow rates and therefore high particle count rates, such as up to 1 Million per second. Although not shown, in some examples, fluid actuator 204 is positioned to cause inertial pumping that pushes biologic particles through the region at sensor 206 while in some examples, fluid actuator 204 is positioned to cause inertial pumping that pulls biologic particles through the region at sensor 206, as shown in FIG. 10.

Figure 11:
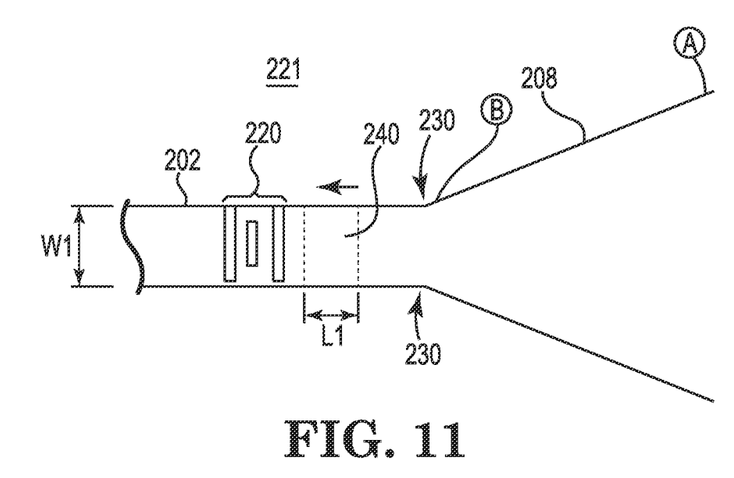
FIG. 11 is an enlarged partial plan view schematically illustrating a sensing portion within a microfluidic channel structure, according to an example of the present disclosure.

FIG. 11 is an enlarged partial side view schematically illustrating a sensing portion 221 of a microfluidic channel structure, according to an example of the present disclosure. In some examples, the sensing portion 221 forms part of a microfluidic device having at least some of substantially the same features and attributes as microfluidic device 20, 80 as previously described in association with at least FIGS. 1-10. As shown in FIG. 11, sensing portion 221 includes inlet 208 in communication with channel 202. In some examples, inlet 208 has a cone-shape that begins (at A) with a diameter substantially larger than a width (W1) of the channel 202 and then decreases to an end point (at B) at a junction 230 with the channel 202 to match the width of the channel 202. Among other features, the cone-shaped inlet 208 contributes to forming a non-uniform flow field to facilitate aligning biologic particles into a single file for one-at-a-time movement through the channel 202 at attribute sensor(s) 220. While omitted for illustrative clarity, in some examples a filter 210 is provided within inlet 208 to exclude biologic particles having a size larger than a size of the biologic particles of interest, i.e. target biologic particles to be counted. In some examples, such filter 210 comprises pillars spaced apart by a distance that enables fluid flow and passage of the target biologic particles but which prevents passage of the larger biologic particles. This filter 210 further contributes to the non-uniform flow field which aligns the target biologic particles for single file entry and passage through channel 202 at the attribute sensor(s) 220. As previously mentioned, this filter 210 is sometimes referred to as an exclusion structure.

In some examples, the sensor 220 includes resistive elements that act as an impedance sensor to detect attributes of target biologic particles. For example, one attribute detected via the sensor 220 includes counting the biologic particles as they pass one-at-a-time through the sense region of channel 202.

Figure 12:
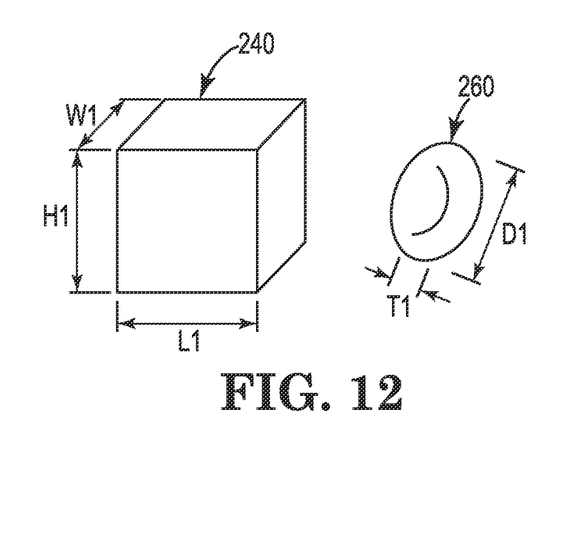
FIG. 12 is a diagram schematically illustrating a sense region volume and a biologic particle volume, according to an example of the present disclosure.

In some examples, channel 202 is formed with a cross-sectional area to define a sense volume 240 of fluid (including a single target biologic particle) that moves through the channel 202 and over sensor 220. As shown at least partially in FIG. 11, the sense volume 240 has a width (W1), a length (L1), and a height (H1), which is further depicted in FIG. 12. The sense volume 240, depicted in FIGS. 11-12 is not a physical structure but rather a representation of a volume of fluid that moves through the channel 202 over/through sensor 220 and which is just large enough to carry a single biologic particle 260. While FIG. 12 depicts a red blood cell (RBC), it will be understood that biologic particle 260 is not limited to biologic particles of the blood but can be any biologic particle of a biologic fluid (biologic fluid preparation) or other food-related biologic particle, such as yeast cells.

It will be understood that the sense volume 240 is not necessarily a cube but can form other shapes that generally correspond to a cross-sectional shape of the channel 202 through which the fluid moves in the region of sensor 220. For example, if the channel 202 in that region has a generally circular cross-sectional shape, the sense volume takes on a generally disc shape, cylindrical shape, or spherical shape. Accordingly, a sense volume represents a volume of fluid in which a particular biologic particle resides as the target biologic particle moves through channel 202 in region of sensor 220 at a time at which the biologic particle is being sensed for counting.

It will be further understood that any given type of target biologic particle will have its own unique geometry, and that the target biologic particles described herein are not limited to the shape and size of the biologic particle illustrated in FIG. 12. Accordingly, a volume of the target biologic particle will not necessarily have a uniform shape, topology, etc. Nevertheless, as one example, FIG. 12 depicts a red blood cell having diameter (D1) and a thickness (T1) and a generally disc-shaped appearance. Moreover, in some examples, for purposes of counting cells via sensor 220 and for aligning biologic particles into a single file in channel 202 at the region of sensor 220, the overall volume of the biologic particle 260 can be less significant than the value of the greatest dimension (e.g. height, width, length, diameter, etc.) of the biologic particle which may be the factor by which the biologic particles become sorted and aligned into a single file. Accordingly, depending on the target biologic particle of interest, the size/shape of the channel 202 is selected to form a sense volume of fluid that by definition will carry just one biologic particle.

In some examples, the sense volume has the same order of magnitude as a volume of the target biologic particle carried within the sense volume. Stated differently, a volume of a sense region has the same order of magnitude as a volume of the target biologic particle carried within the volume of fluid moving through or over sensor 220 at the time of sensing.

This arrangement enables a high signal-to-noise ratio (SNR) at the location of the sensor 220 to yield a highly efficient and effective counting mechanism. In particular, because a small volume of fluid is present in the vicinity of the sensor 220 for each biologic particle being counted, a relatively stronger signal is registered for each biologic particle that is present at a particular instance of sensing (i.e. at a particular snapshot or window of the sensing data signal).

In some examples, a volume fraction is defined by a ratio of the volume of a single biologic particle relative to the sense volume. In some examples, the volume fraction is on an order of tenths, such as 0.1 (i.e. 10%). For instance, if the fluid sample is whole blood and the target biologic particle is red blood cells, then the largest dimension (in this instance, a diameter) of the target biologic particle is about 6 micrometers, and a volume of on the order of 0.1 picoLiters (e.g. $9 \times 10^{-17}$ Liters in some instances). Assuming the first sense channel provides for a cross-sectional area of about 100 micrometers, and a length of 10 micrometers, then the first channel is sized to define a sense volume of about 1 picoLiters. In this scenario, the volume fraction would be about 0.1, as mentioned above. It will be understood that this example is not strictly limiting, as depending on the particular biologic particle and the particular size and shape of the channel at the sense region, in some examples the sense volume can range from 1 to 10 times the volume of the biologic particle.

Given that commercially available cytometers greatly dilute the fluid (e.g. up to 100 to 1000 times) in which the biologic particles reside in order to sufficiently separate the biologic particles to enable counting via the techniques available to them, they provide volume fractions such as 0.001 (0.1%), which is about two orders of magnitude greater than the volume fraction achieved via at least some examples of the present disclosure.

However, examples of the present disclosure are not strictly limited to operating according to volume fractions of 0.1, but rather can operate according to different volume fractions (e.g. 0.25, 0.4, 0.5, 0.6, 1.1, 1.5 etc.) depending on the particular type of biologic particle, which has its own unique shape and size.

In some examples, the size and shape of the channel in the sensing region account for behavioral characteristics of the particular biologic particle of interest. For example, red blood cells are readily conformable, and therefore the size and shape of the channel at the sensing region to receive red blood cells can be made to closely match the size of the red blood cells because it can be expected that the red blood cells will bend, compress, or conform enough to enable their entry into the sensing region. Conversely, other particles that have odd dimensions (elongate, triangular, etc.) or that are relatively less conformable may involve providing a size and shape of the sensing region of the channel that is more forgiving in view of the particular characteristics of that biologic particle of interest.

In some examples, a microfluidic device is employed to count biologic particles other than blood cells. For example, some viruses or bacteria present within a fluid sample can be counted. Some viruses have a diameter on the order of 50-300 nanometers, while some bacteria have dimensions on the order of 3×0.6 micrometers. In some examples, sperm or eggs are counted with sperm having dimensions on the order of 5 micrometers and eggs having dimensions on the order of 130 micrometers. Some types of these biologic particles (e.g. some viruses) can be an order of magnitude or two orders of magnitude smaller than other biologic particles, such as red blood cells. Accordingly, in some of these examples, additional structures are employed within channel 202 to provide the desired sense volume, such as later further described in association with at least FIGS. 13-15.

It will be further understood that due to the significance resulting from how the shape and size of the channel 202 (at least in the region of sensor 220) is defined to correspond generally to the size and shape of the target biologic particle, in some examples a different microfluidic device or chip is provided to test each different target biologic particle. In some examples, a single microfluidic device counts different target biologic particles but does so by providing different channels 202 to do so, with each different channel being dedicated to testing for a particular target biologic particle while excluding differently sized/types of other biologic particles. In some examples, as further described later in association with at least FIG. 16, a single microfluidic device includes a series of channel portions, with each channel portion sized and shaped to provide a sense volume (at the region of sensor 220) corresponding to a target biologic particle such that the series of channel portions provide single file (one-at-a-time) counting of different target biologic particles in a sequence. In some examples, as further described later in association with at least FIG. 17, a single microfluidic device provides parallel channels in which each channel detects a different type/size of target biologic particles from a single fluid sample with at least some of the different channels utilizing a sense volume different than a sense volume defined by other respective channels.

Figures 13, 14, 15:
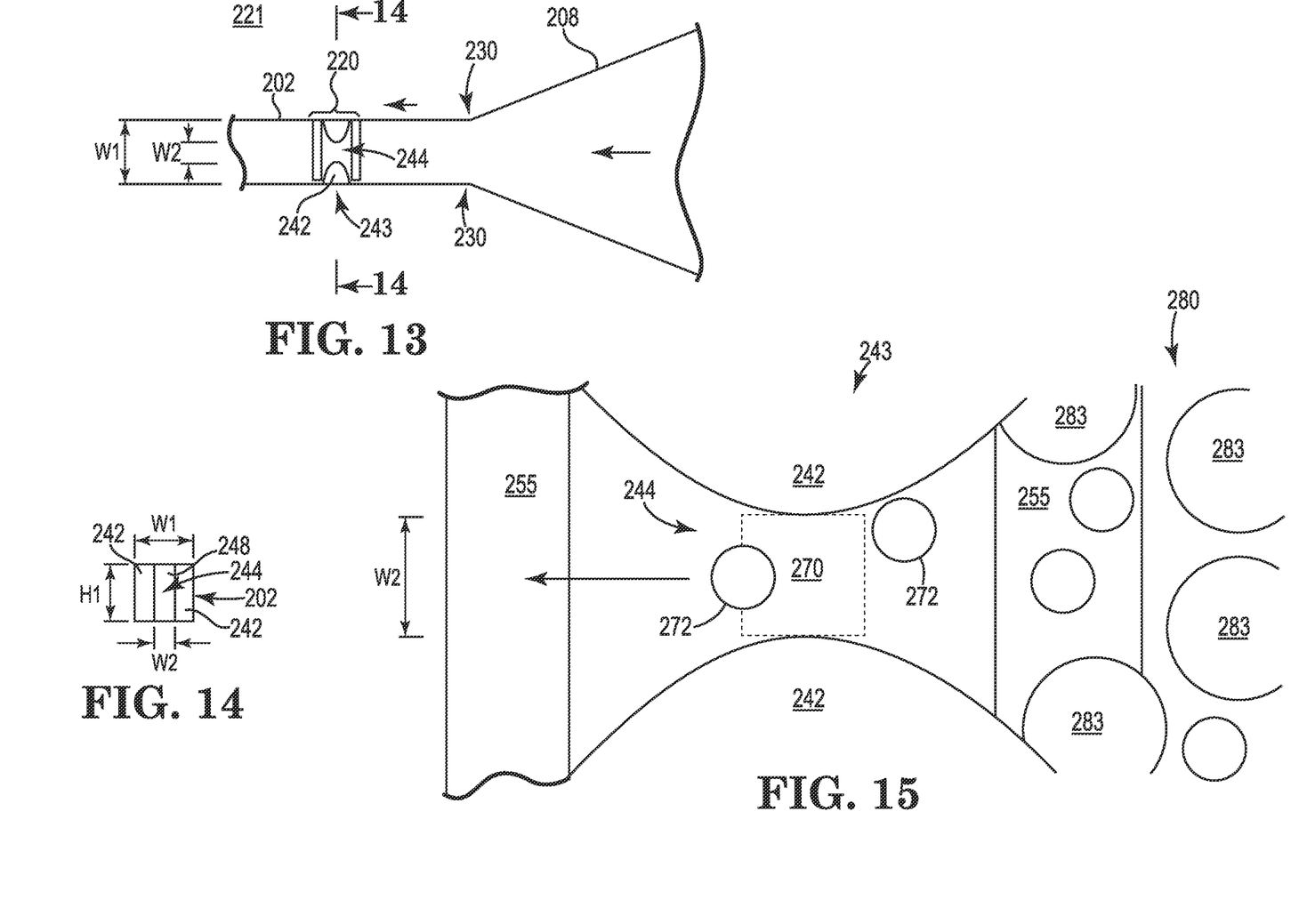
FIG. 13 is an enlarged partial plan view schematically illustrating a sensing portion within a microfluidic channel structure, according to an example of the present disclosure.
FIG. 14 is a sectional view at taken along lines 14-14 of FIG. 13 to schematically illustrate a constriction associated with a sense region, according to an example of the present disclosure.
FIG. 15 is an enlarged partial plan view schematically illustrating a sense region within a microfluidic channel structure, according to an example of the present disclosure.

FIG. 13 is an enlarged partial side view schematically illustrating a sensing portion 241 of a microfluidic channel structure, according to an example of the present disclosure. In some examples, the sensing portion 241 comprises a sensing portion having at least some of substantially the same features and attributes as sensing portion 221, as previously described in association with at least FIGS. 11-12.

As shown in FIG. 13, sensing portion 241 defines a channel 202 having a sensor region 243 at which protrusion(s) 242 formed in channel 202 are provided to define a constriction 244 in close proximity to the sensor 220. At that point along channel 202, the constriction 244 defines a width (W2) that is less than a general width (W1) of channel 202. In some examples, this arrangement is employed when it is desirable to retain a general width (W1) of channel 202 yet still provide structures (e.g. constriction 244) to achieve single file alignment and counting of target biologic particles that have a volume (or largest dimension) that is significantly smaller than a cross-sectional area of the channel 202.

FIG. 14 is a sectional view as taken along lines 14-14 of FIG. 13 that schematically illustrates the available slot 248 (having width W2) through which fluid and particles can flow at the point of constriction 244.

FIG. 15 is an enlarged partial side view of a constriction 244 in a channel near a sensor region, according to an example of the present disclosure. As shown in FIG. 15, the constriction 244 is formed via two protrusions 242 on opposite side walls of channel 202.

In some examples, as shown in FIGS. 13, 15, the constriction 244 is located coextensively with at least a portion of sensor 220. In other words, the constriction occupies at least some of generally the same space as a portion of the sensor 220. In the particular non-limiting example shown in FIG. 15, resistive elements 255 of sensor 220 straddle the constriction 244 defined by protrusions 266. In this way, a sense volume 270 is defined in close proximity to sensor 220 such that at the time (or close to) of sensing a target biologic particle 272, the sense volume 270 in which the target biologic particle 272 resides has a volume on the same order of magnitude of the volume of the target biologic particle 272 to thereby ensure that a single target biologic particle 272 passes through the sensor region (e.g. single file) to provide one-at-a-time sensing of biologic particles. In some examples, the constriction 244 is located just prior to (e.g. upstream) and immediately adjacent to the resistive elements of sensor 220.

In some examples, as further shown in FIG. 15, channel 202 further defines a filter 280 (including elements 282) just prior to the constriction 244 to further exclude biologic particles (not shown) larger than the target biologic particles 272 for which the constriction 244 is sized and shaped. In addition to providing a size/shape limitation to enable passage of target biologic particles 272 (while excluding other larger particles), the presence of the protrusions 242 in combination with filter 280 produces a non-uniform fluid flow to cause alignment of the target biologic particles 272 into a single file for passage through constriction 244 and through sensor 220.

Figure 16:
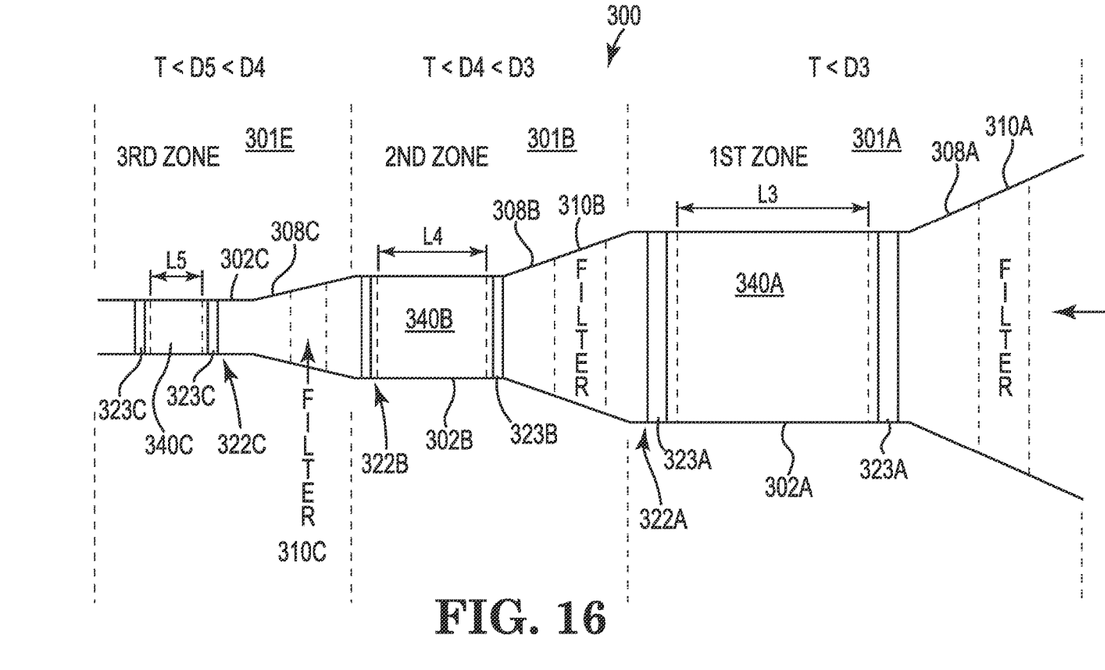
FIG. 16 is a diagram including a side plan view schematically illustrating a series of sensing portions within a microfluidic channel structure, according to an example of the present disclosure.

FIG. 16 is a side view schematically illustrating a sensing portion 300 of a microfluidic channel structure, according to an example of the present disclosure. In some examples, the sensing portion 300 forms part of a microfluidic device having at least some of substantially the same features and attributes as microfluidic device 20, 80 as previously described in association with at least FIGS. 1-10 and with sensing portion 300 including at least some of substantially the same features and attributes as previously described in association with FIGS. 11-15.

With reference to at least FIG. 16, it will be understood that the elements of the sensing portion 300 are not necessarily drawn to scale but, at least, provide a demonstration of relative sizes and shapes.

As shown in FIG. 16, sensing portion 300 includes a series of sensing zones 301A ($1^{st}$ Zone), 301B ($2^{nd}$ Zone), 301C ($3^{rd}$ Zone) shown separated by dashed lines. Each different zone 301A, 301B, 301C is provided to detect or count a different size biologic particle. For example, as depicted in FIG. 16, first zone 301A counts biologic particles having a diameter (or largest dimension) less than a dimension D3, whereas second zone 301B counts biologic particles having a diameter (or largest dimension) less than dimension D4, which is also less than dimension D3. Third zone 301C counts biologic particles having a diameter (or largest dimension) less than dimension D5, which is also less than dimension D4. In each zone, a channel portion 302A, 302B, 302C has a cross-sectional area sized and shaped to cause single file flow of the target biologic particle for that particular channel portion 302A, 302B, 302C to ensure that counting by sensors involves just the target biologic particle for that particular zone. Accordingly, channel portion 302A has a different cross-sectional area than channel portion 302B, and channel portion 302B has a different cross-sectional area than channel portion 302D, and so on.

In some examples, each zone 301A, 301B, 301C includes an inlet 308A, 308B, 308C (respectively) and a filter 310A, 310B, 310C (respectively) to create a non-uniform flow field to facilitate the single file flow of target biologic particles for each respective zone. Moreover, in doing so, each respective filter 310A, 310B, 310C excludes biologic particles larger than the target biologic particle for the particular zone.

Each zone 301A, 301B, 301C includes a sensing region defining a respective sense volume 340A, 340B, 340C (as the biologic particle passes through) that is sized on the same order of magnitude as the particular target biologic particle to be sensed in the corresponding respective zone 301A, 301B, 301C. Zone 301A includes an attribute sensor 322A including elements 323A while zone 301B includes an attribute sensor 322B including elements 323B, and zone 301C includes an attribute sensor 322C including elements 323C.

While not depicted in FIG. 16 for illustrative simplicity, it will be understood that in some examples, the different zones 301A, 301B, 301C do not immediately follow on another but can have other channel portions or components (e.g. pumps, heaters, other attribute sensors, flow rate sensors, etc.) between adjacent or successive zones 301A, 301B, 301C.

Moreover, it will be understood that in some examples, multiple different sensing portions can be arranged in series along a single channel as in FIG. 16, but with each sensing portion having substantially the same sized sense volume as the other sensing portions to count/sense one size of a target biologic particle. In some examples, such an arrangement facilitates validating measurement accuracy or by providing internal controls (i.e. integrity factor).

Figure 17:
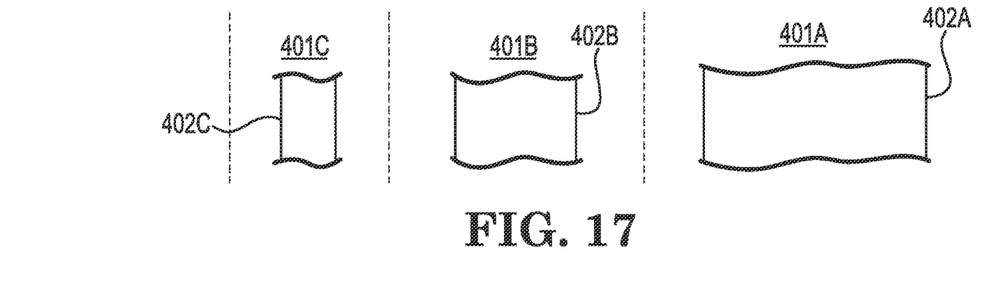
FIG. 17 is a side plan view schematically illustrating several sensing portions arranged in parallel within a microfluidic channel structure, according to an example of the present disclosure.

FIG. 17 is a diagram schematically illustrating a sensing portion 400 of a microfluidic channel structure, according to an example of the present disclosure. In some examples, the sensing portion 400 has at least some of substantially the same features and attributes as sensing portion 300, except instead of arranging the different zones 301A, 301B, 301C (with each including their respective features and attributes) in series, the sensing portion 400 provides similar zones 401A, 401B, 401C in parallel, each having a corresponding channel portion 402A, 402B, 402C. Accordingly, rather than counting the biologic particles in sequence, the sensing portion 400 does so in parallel. In some examples, the different zones 401A, 401B, 401C have the same size sense volumes to enable calibration or to facilitate faster processing of a given fluid sample.

In some examples, all three channel portions 402A, 402B, 402C are in fluid communication with a common reservoir, such as reservoir 214 (FIG. 10). However, in some examples, each channel portion 402A, 402B, 402C receives a fluid (including biologic particles to be processed and counted) from independent fluid reservoir portions and not from a single common reservoir. As such, in some examples, each independent reservoir can include a different composition of fluids. In some examples, the independent reservoir is formed via separation barriers formed in reservoir 214.

At least some examples of the present disclosure provide for high throughput and increased accuracy in cytology with high signal-to-noise ratios achievable via employment of single file sensing and a low fluid dilution factor, among other features and attributes. Accordingly, this arrangement is well suited for deployment in point-of-care (POC) settings to achieve rapid diagnostic and evaluative information.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A biologic test chip comprising:
a substrate;
a microfluidic channel structure formed on the substrate and including a first channel;
a fluid actuator within the microfluidic channel structure, the fluid actuator to drive fluid flow within the first channel;
a sense region within the first channel to receive the fluid flow of biologic particles, the sense region shaped to enforce movement of the biologic particles as carried by the fluid flow on a one-at-a-time basis via operation of the fluid actuator, the sense region having:
a volume on a same order of magnitude as a volume of a single respective one of the biologic particles; and
a non-uniform flow region including an inlet to the first channel, the inlet having a progressively narrowing cross-sectional area in a downstream orientation with respect to a direction of the fluid flow; and
a sensor disposed in the first channel and at the sense region to provide electrical output signals indicative of a count of the biologic particles passing through the sense region.

2. The chip of claim 1, wherein the sense region operates according to a volume fraction in which a ratio of the volume of each single biologic particle relative to the volume of the sense region is on an order of tenths.

3. The chip of claim 2,
wherein the sensor includes at least one impedance sensor generally coextensive within the sense region to count biologic particles passing through the sense region, the sensor to provide the electrical output signals based on impedance changes as the biological particles pass over the sensor, the electrical output signals being proportional to sizes of the biological particles and indicative of the count of the biological particles.

4. The chip of claim 3, wherein the biologic particles are subject to a dilution factor on the order of tens.

5. The chip of claim 4, wherein the channel structure includes the non-uniform flow portion shaped to provide a non-uniform flow field and to align the biologic particles into a single file flow pattern through the sense region, the non-uniform flow portion further including:
an exclusion structure upstream from the sense region to exclude biologic particles larger than the volume of the sense region.

6. The chip of claim 5, wherein the first channel generally defines a first cross-sectional area and the first channel includes a constriction generally coextensive with the sense region in which the constriction has a second cross-sectional area substantially less than the first cross-sectional area, wherein the fluid actuator is disposed proximal to the sensor and includes a deflective membrane element to deflect and displace fluid within the first channel.

7. The chip of claim 1, wherein at least some of the biologic particles are blood cells, wherein the fluid actuator is disposed downstream from the sensor and includes:
a thermal resistor; and
a nozzle disposed proximal to the thermal resistor, wherein the thermal resistor is to produce a vapor bubble to displace fluid within the first channel and to eject fluid from the nozzle.

8. A biologic test chip comprising:
a substrate;
a microfluidic channel structure formed on the substrate and including:
a first sensing portion including a first channel to receive a fluid including a first size biologic particles, the first channel including a first sense region having a first volume on a same order of magnitude as a volume of a single one of the first size biologic particles to cause single file counting at the first sense region;

a second sensing portion including a second channel to receive a fluid including a second size biologic particles, the second channel including a second sense region having a second volume on a same order of magnitude than a volume of a single one of the second size biologic particles to cause single file counting at the second sense region;

wherein each of the first channel and the second channel respectively includes a non-uniform flow portion including an inlet respectively to the first channel and to the second channel, the inlet having a progressively narrowing cross-sectional area in a downstream orientation with respect to a direction of the fluid flow; and a first sensor disposed in the first channel and at the first sense region to provide electrical output signals indicative of a count the biologic particles passing through, respectively, the first sense region.

9. The chip of claim 8, wherein the first and second biologic particles are subject to a dilution factor on the order of tens, and the first sensor is to provide the electrical output signals based on impedance changes caused by the biological particles passing over the first sensor.

10. The chip of claim 8, wherein each non-uniform flow portion is to align the biologic particles into a single file flow pattern through the respective first and second sense regions, and each non-uniform flow portion further includes:
an exclusion structure upstream from the first and second sense regions to exclude biologic particles larger than the volume of the respective first and second sense regions.

11. The chip of claim 8, wherein the respective first and second sensing portions are arranged in series, with the second sensing portion located downstream from the first sensing portion.

12. The chip of claim 8, wherein the respective first and second sensing portions are arranged in parallel.

13. A kit comprising:
a plurality of different biologic test chips with each chip corresponding to a differently-sized biologic particle, wherein each chip includes:
a substrate;
a microfluidic channel structure formed on the substrate and including a first channel;
a fluid actuator within the microfluidic channel structure;
a sense region within the first channel to receive a single file fluid flow of biologic particles via operation of the fluid actuator, the sense region having:
a volume on a same order of magnitude as a volume of a single respective one of the biologic particles; and
a non-uniform flow region including an inlet to the first channel, the inlet having a progressively narrowing cross-sectional area in a downstream orientation with respect to a direction of the fluid flow such that the inlet has a first diameter that is larger than a width of the first channel and the inlet decreases to a second diameter that matches the width of the first channel at a junction between the first channel and the inlet; and
a sensor disposed in the first channel and at the sense region to provide electrical output signals indicative of a count the biologic particles passing through the sense region,
wherein the sense volume of the sense region of a respective different chip corresponds a size of the biologic particle for that respective different chip.

14. The kit of claim 13, wherein the sensor includes at least one impedance sensor for counting the biologic particles and to provide the electrical output signals based on impedance changes as the biological particles over the sensor, the sensor being on-board the respective chip.

15. The kit of claim 13, wherein the biologic particles are subject to a dilution factor on the order of tens, and wherein the channel structure includes the non-uniform flow portion to align the biologic particles into a single file flow pattern through the sense region, the non-uniform flow portion further:
an exclusion structure upstream from the sense region to exclude biologic particles larger than the volume of the sense region.

16. The kit of claim 13, wherein the the inlet is cone-shaped, and the kit further includes:
a control interface to couple to at least one of the different biologic test chips and to provide the electrical signals to the host device from the at least one of the different biologic test chips; and
the host device including a central processing unit (CPU), the host device being coupled to the control interface to send and receive data to and from the control interface, including the electrical output signals.

17. The chip of claim 1, wherein the biological test chip is a microfluidic device with the fluid actuator and the sensor being on-board the microfluidic device.

18. The chip of claim 1, wherein the channel structure includes the inlet shaped to provide a non-uniform flow field and to align the biologic particles into a single file flow pattern through the sense region, such that the biologic particles pass through the sense region one-at-a-time.

19. The chip of claim 8, further including a second sensor disposed in the second channel and at the second sensing portion to count the biologic particles passing through, respectively, the second sensing portion.

20. The chip of claim 8, wherein the first sensor includes an impedance sensor within the first sense region to count biologic particles passing through the first sense region.

* * * * *